(12) United States Patent
Kesler (10) Patent No.: US 11,594,947 B2
(45) Date of Patent: Feb. 28, 2023

(54) SYSTEMS AND METHODS FOR MAGNETIC ROTATIONAL COUPLING DEVICES

(71) Applicant: KKI HOLDINGS, LLC, Dover, DE (US)

(72) Inventor: Kris Kesler, Paradise Valley, AZ (US)

(73) Assignee: MATTUR HOLDINGS, INC., Scottsdale, AZ (US)

( * ) Notice: Subject to any disclaimer, the term of this patent is extended or adjusted under 35 U.S.C. 154(b) by 0 days.

(21) Appl. No.: 17/012,492

(22) Filed: Sep. 4, 2020

(65) Prior Publication Data

US 2021/0075308 A1 Mar. 11, 2021

Related U.S. Application Data

(60) Provisional application No. 62/896,251, filed on Sep. 5, 2019.

(51) Int. Cl.
*H02K 49/10* (2006.01)

(52) U.S. Cl.
CPC .................. *H02K 49/108* (2013.01)

(58) Field of Classification Search
CPC .. H02K 1/00; H02K 1/12; H02K 1/18; H02K 21/24; H02K 41/00; H02K 41/03
USPC ................. 310/156.43–156.66, 268
See application file for complete search history.

(56) References Cited

U.S. PATENT DOCUMENTS

| | | | |
|---|---|---|---|
| 4,459,501 A * | 7/1984 | Fawzy | H02K 21/125 310/268 |
| 4,996,457 A * | 2/1991 | Hawsey | H02K 1/278 310/112 |
| 6,037,696 A * | 3/2000 | Sromin | H02K 1/2793 310/112 |
| 6,373,162 B1 * | 4/2002 | Liang | H02K 1/2793 310/156.53 |
| 6,841,916 B2 * | 1/2005 | Chiarenza | H02K 21/24 310/156.56 |
| 7,489,060 B2 | 2/2009 | Qu et al. | |
| 9,287,761 B2 | 3/2016 | Reinosa et al. | |
| 9,997,986 B2 | 6/2018 | Haggard | |
| 10,141,821 B2 | 11/2018 | Takemoto et al. | |
| 2007/0284956 A1 | 12/2007 | Petrovich et al. | |
| 2009/0230811 A1 * | 9/2009 | Asano | H02K 21/24 310/216.001 |

FOREIGN PATENT DOCUMENTS

WO 2019/022624 1/2019

OTHER PUBLICATIONS

ISR and Written Opinion for International App. No. PCT/US20/49496 dated Dec. 9, 2020 (16 pages).

* cited by examiner

*Primary Examiner* — Tran N Nguyen
(74) *Attorney, Agent, or Firm* — K&L Gates LLP (57) ABSTRACT

Improved magnetic rotor assemblies are provided. In one embodiment, a magnetic rotor assembly includes two or more rotor disks. The rotor disks may each contain corresponding sets of permanent magnets, which may be circumferentially disposed around the disks. The disks may then positioned near one another such that the disks are magnetically coupled. In certain instances, the N-poles of the permanent magnets may face one another. In other instances, the S-poles of the permanent magnets may face one another.

16 Claims, 6 Drawing Sheets

SYSTEMS AND METHODS FOR MAGNETIC ROTATIONAL COUPLING DEVICES

CROSS-REFERENCE TO RELATED APPLICATIONS

The present application claims priority to U.S. Provisional Patent Application No. 62/896,251 filed on Sep. 5, 2019, the disclosure of which is incorporated herein by reference for all purposes.

TECHNICAL FIELD

The present invention generally relates to rotational coupling devices, and more particularly relates to reduced-friction torque transmission components.

BACKGROUND

Mechanical machines transform and/or transfer energy through the use of fixed and moving components interposed between the source of power and the load or work to be done. The result is a kinematic chain of linkages, couplings, gears, and other such mechanical interfaces that are prone to frictional energy loss in the form of heat and sound. These and other such dissipative forces can significantly reduce a system's efficiency, which is typically expressed as the ratio of power output to power input.

While various types of low-friction couplings have been developed over the years, such designs are unsatisfactory in a number of respects. For example, magnetic "gears" have been developed that feature an array of strong permanent magnets disposed circumferentially at regular angular intervals around their perimeters. Such mechanical couplings have been successful in providing gear-like movement with little or no friction; however, their use of a simple, single layer of magnets has proven non-optimal with respect to providing a strong, slip-free rotational coupling between elements at high rotational speeds and torques.

Accordingly, systems and methods are needed that overcome these and other limitations of the prior art. For example, there is a long-felt need for highly efficient, frictionless rotational couplings that can operate under high power conditions.

SUMMARY

The present disclosure presents new and innovative magnetic rotor assemblies and methods for providing the same. In a first aspect, a magnetic rotor assembly is provided that includes a first rotor disk and a second rotor disk. The first rotor disk may include a first disk and a first set of permanent magnets circumferentially disposed about the first disk such that their N-poles face outward from a first side of the first disk. The second rotor disk may include a second disk and a second set of permanent magnets circumferentially disposed about the disk such that their N-poles face outward from a first side of the second disk. The first side of the first disk may face the first side of the second disk such that the first rotor disk and the second rotor disk are magnetically coupled to each other.

In a second aspect according to the first aspect, the first set of permanent magnets may be circumferentially disposed about the first disk such that their S-poles face outward from the first side of the first disk and the second set of permanent magnets may be circumferentially disposed about the second disk such that their S-poles face outward from the first side of the second disk.

In a third aspect according to any of the first or second aspects, the first side of the first disk is separated from the first side of the second disk.

In a fourth aspect according to any of the first through third aspects, the first side of the first disk is separated from the first side of the second disk by 0.125 to 0.635 cm.

In a fifth aspect according to any of the first through fourth aspects, the first side of the first disk is in contact with the first side of the second disk.

In a sixth aspect according to any of the first through fifth aspects, each of the magnets of the first set of permanent magnets is a disc-shaped neodymium magnet secured within a corresponding recess within the first disk.

In a seventh aspect according to any of the first through sixth aspects, the first and second sets of permanent magnets each comprise 12 rare-earth magnets.

In an eighth aspect according to any of the first through seventh aspects, the rare-earth magnets have a diameter of approximately 1 inch.

In a ninth aspect according to any of the first through eighth aspects, the first disk body and second disk each comprise graphite and are approximately 7 inches in diameter.

In a tenth aspect according to any of the first through ninth aspects, each of the permanent magnets are positioned approximately ⅛ of an inch from their respective disk.

In an eleventh aspect, a method is provided that includes providing a first disk and a second disk and positioning a first set of permanent magnets within the first disk, such that the first set of permanent magnets are circumferentially disposed about the first disk. The method may also include positioning a second set of permanent magnets within the second disk, such that the second set of permanent magnets are circumferentially disposed about the second disk. The method may further include positioning the first disk and the second disk such that the first set of permanent magnets face the second set of permanent magnets such that the first and second disks are magnetically coupled to form a magnetic rotor assembly.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE DRAWING FIGURES

The present invention will hereinafter be described in conjunction with the appended drawing figures, wherein like numerals denote like elements, and.

DETAILED DESCRIPTION OF PREFERRED

Exemplary Embodiments

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to an improved, frictionless torque transmission device that employs a novel form of magnetic coupling rather than mechanical coupling to reduce or substantially eliminate frictional power losses.

Referring now to the general block diagram of FIG. 1, a magnetic coupling assembly 100 in accordance with an exemplary embodiment generally includes an input shaft 110 rigidly coupled to a substantially disc-shaped magnetic rotor assembly (or "input rotor assembly") 131, which is magnetically coupled (as described in further detail below) to a first magnetic rotor assembly (or "output rotor assembly") 132 and a second magnetic rotor assembly (or "output rotor assembly") 133. Output rotor assemblies 132 and 133 are rigidly coupled to respective output shafts 121 and 122 such that rotation of input shaft 110 results in a corresponding rotation of output shafts 121 and 122.

Figure 1:
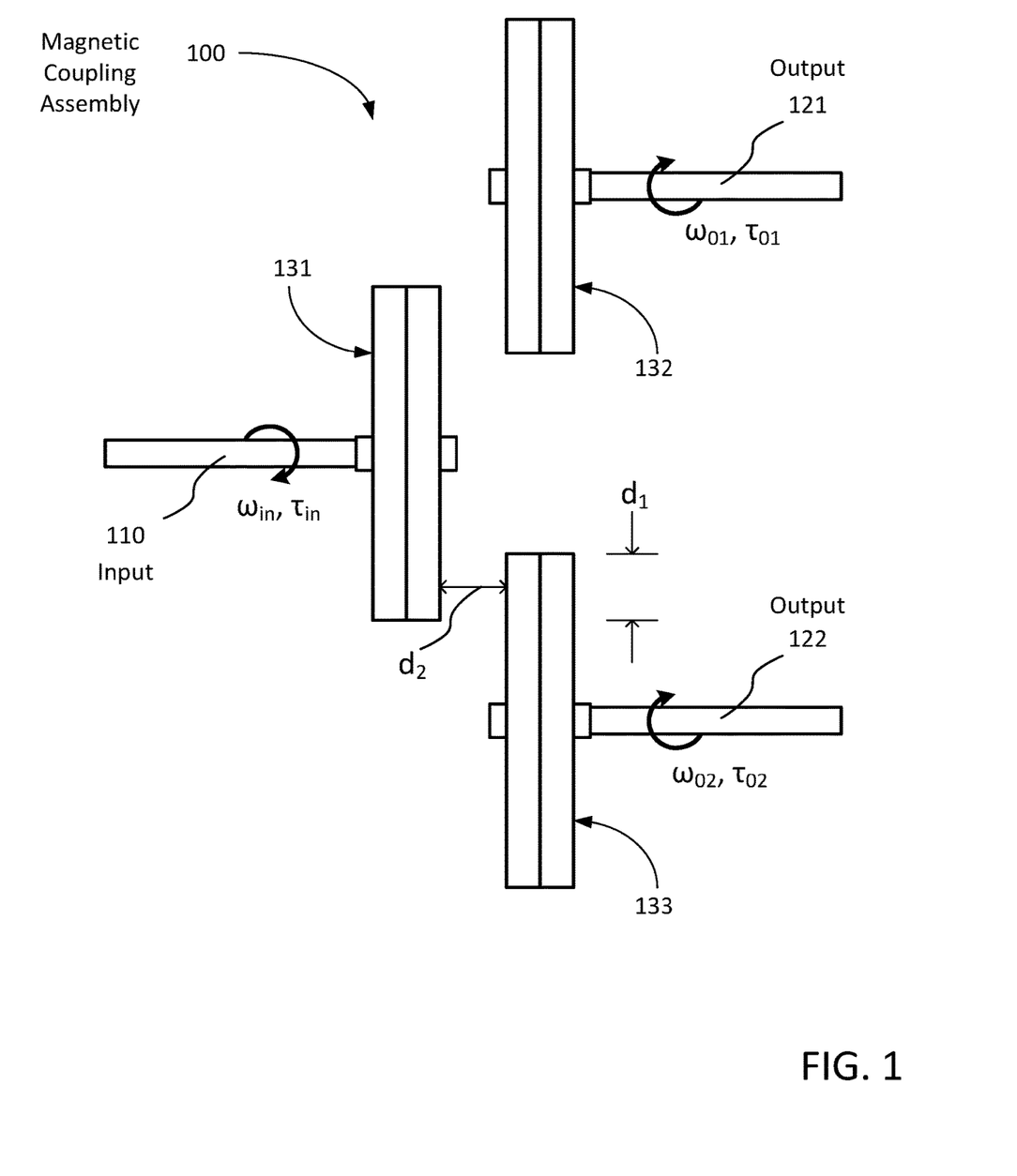
FIG. 1 is schematic overview of a magnetic coupling assembly in accordance with an exemplary embodiment.

In this regard, while the example magnetic coupling assembly of FIG. 1 is illustrated in the context of a single input rotor assembly (131) driving two output rotor assemblies (132, 133), it will be appreciated that the present invention is not so limited: any given input rotor assembly may be magnetically coupled to any number of output rotor assemblies, including, in some embodiments, a single output rotor assembly.

It will also be appreciated that the various components illustrated in FIG. 1 are not necessarily drawn to scale. For example, while rotor assemblies 131, 132, and 133 are illustrated as having substantially identical diameters, in some embodiments the rotor assemblies are configured with different diameters (including different radial locations of their respective magnets) to achieve a particular mechanical advantage and/or rotational speed ratio. In the interest of clarity, various conventional mechanical components well known in the art have not been illustrated in FIG. 1, such as bearings, shaft couplings, output loads (e.g., electrical generators), input drives (e.g., electrical motors) and the like.

In order to achieve the desired magnetic coupling behavior, each pair of adjacent magnetically coupled rotor assemblies (e.g., input rotor assembly 131 and output rotor assembly 133) are positioned such that their circumferences overlap by a distance $d_1$ (in a direction orthogonal to their axes of rotation) and are separated by a distance $d_2$ (in a direction parallel to their axes of rotation) as shown. In one embodiment, $d_1$ ranges from 1.5 to 2.5 cm (preferably about 2.0 cm), and $d_2$ ranges from 0.125 to 0.635 cm (preferably about 0.380 cm). These dimensions may vary (and may be optimized either analytically or empirically) depending upon, among other things, the geometry of the rotor assemblies and the strength, size, and distribution of the individual magnets.

During operation, by virtue of magnetic coupling, output shafts 121 and 122 rotate in response to rotation of input shaft 110, which may be driven, for example, by an electrical motor or the like (not illustrated). Depending upon the radial position of the circular array of magnets integrated into each rotor assembly (also referred to as the "effective diameter"), the available torque and rotational speed of each output shaft 121 and 122 ($\tau_{o1}$, $\omega_{o1}$, $\tau_{o2}$, $\omega_{o2}$) can be computed as a function of the applied torque and rotational speed of input shaft 110 ($\tau_{in}$, $\omega_{in}$).

For example, consider an embodiment in which the effective diameters of rotor assemblies 131, 132, and 133 are equal. In such a case, $\omega_{o1}=\omega_{o2}=\omega_{in}$, and the torque available at each output 121 and 122 is equal to half that of input 110, i.e.: $\tau_{o1}=\tau_{in}/2$; $\tau_{o2}=\tau_{in}/2$. Thus, given that that the power provided by each axle is the product of torque and rotational speed, the power available at outputs 121 and 122 is half that of input 110, minus any losses. In accordance with the present invention, such losses are extremely low (indeed, even negligible) as a result of the non-contact, frictionless nature of the magnetic coupling between adjacent rotor assemblies—particularly when compared to the substantial loss to friction and heat that arises between mechanical gears in conventional systems.

Having thus given an overview of an example magnetic coupling assembly, the individual rotor assemblies will now be described with reference to the flowchart of FIG. 6 in conjunction with FIGS. 2-5.

Figure 6:
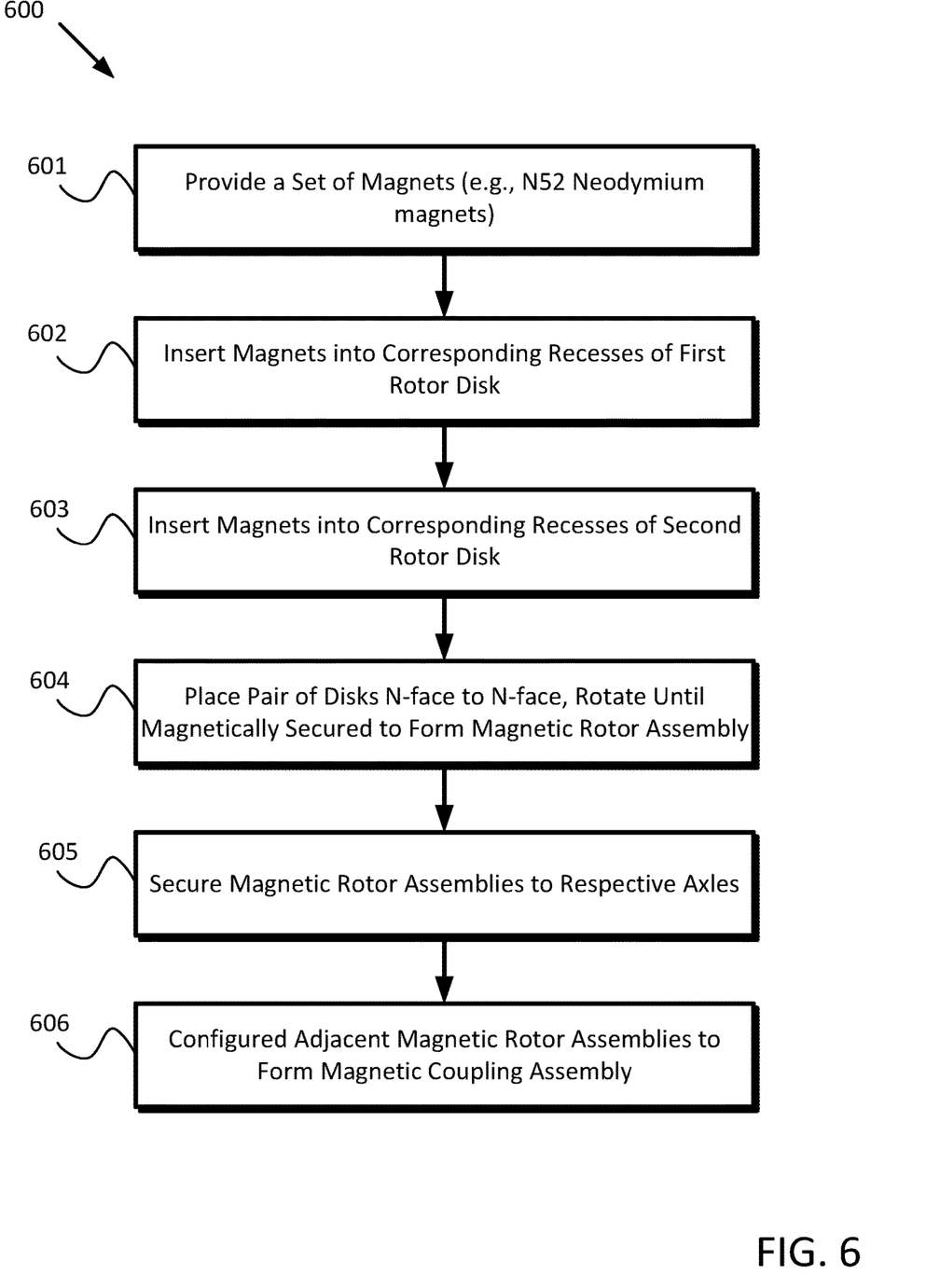
FIG. 6 is a flowchart illustrating a method of forming a magnetic coupling assembly in accordance with various embodiments.

Referring first to the exemplary method 600 of FIG. 6, a method of assembling a magnetic coupling system in accordance with various embodiments generally includes: providing a set of magnets (e.g., rare earth magnets, such as N52 Neodymium magnets (step 601); inserting or otherwise integrating a portion of those magnets into a first rotor disk (step 602); inserting or otherwise integrating a portion of the magnets into a second rotor disk (step 603), placing the pair of disks face-to-face (e.g., with N-orientated faces adjacent to each other) and rotating the disks gradually until the disks attract each and become magnetically secured, thereby forming a single magnetic rotor assembly (step 604); connecting the magnetic rotor assembly to an axle (step 605); and combining the magnetic rotor assembly with one or more other, adjacent magnetic rotor assemblies to form the finished magnetic coupling assembly (step 606). Each of these steps will now be described in further detail.

Figure 2:
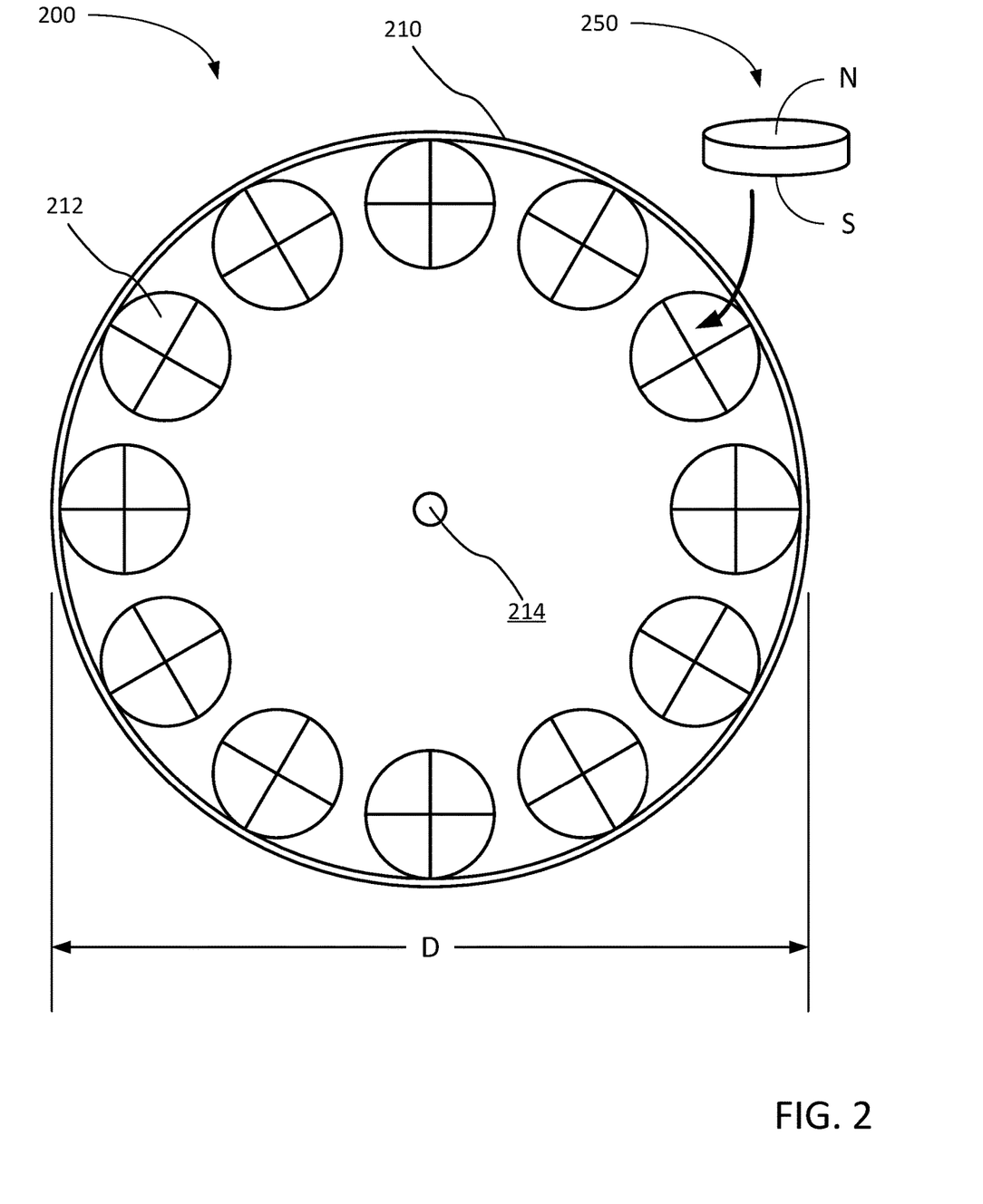
FIG. 2 illustrates the insertion of magnets into a rotor disk in accordance with various embodiments.

Referring first to the exemplary rotor disk 200 illustrated in FIG. 2, assembly begins with the step of procuring a set of magnets 250. In one embodiment, for example, each magnet 250 is a circular, nickel-plated N52-type neodymium rare earth magnet having a 1.0" diameter and a thickness of ⅛". Magnets 250 and are then fixed circumferentially in a regular pattern to a rotor disk (or "disk body") 210 such that their magnetic poles face the same direction (e.g., all N-poles facing out of the page relative to FIG. 2).

In one embodiment, rotor disk 210 is an aluminum, carbon fiber, or graphite disk (e.g., a 3D-printed graphite disk) having an outer diameter D of 7.0", a thickness of 3/16", and a central bore 214 having an inner diameter (e.g., ½") configured to accept an axle as described above.

Twelve recessed regions 212 are formed within disk 210, each configured to tightly receive a corresponding magnet 250. Thus, regions 212 exhibit 12-fold rotational symmetry and are arranged at regular 30-degree increments around the perimeter. Magnets 250 may be secured within their corresponding recesses with a suitable adhesive, such as a UV-protected water-proof adhesive. In the illustrated embodiment, magnets 250 are positioned ⅜" away from the perimeter of disk 210 and their centers are approximately ½" apart.

It will be appreciated that the rotor disk 200 as illustrated in FIG. 2 is not intended to be limiting in any way. Magnets 250 may have a variety of geometries (thickness, shape, etc.), and any number of such magnets (e.g., greater than or less than 12) may be secured to disk 210. In addition, magnets may be positioned closer or farther away from the perimeter of disk 210.

Figure 3A:
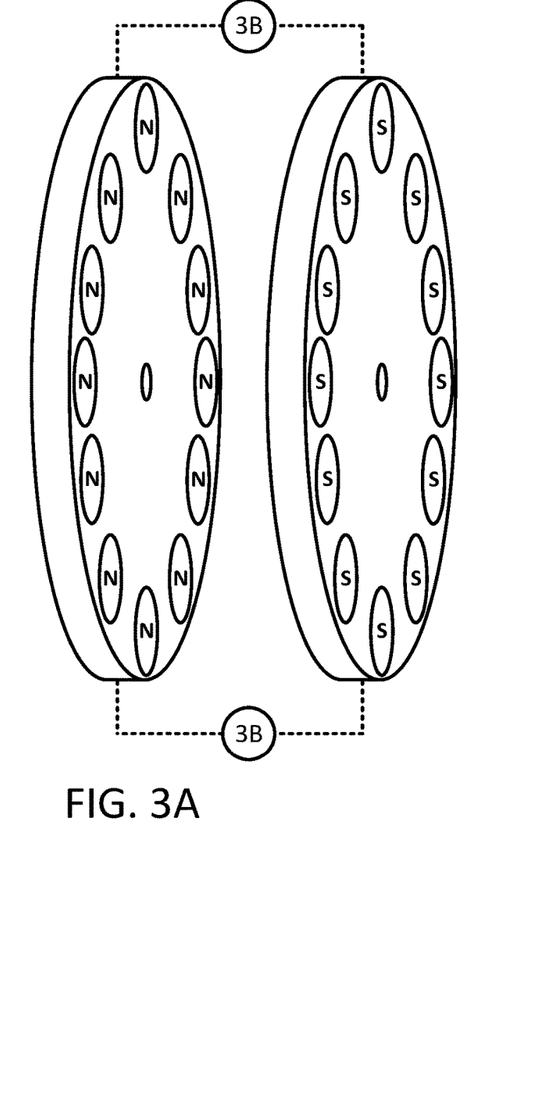
FIGS. 3A, 3B, 4A, and 4B sequentially illustrate the joining of two magnetic rotor disks together to form a magnetic rotor assembly in accordance with one embodiment.
Figure 3B:
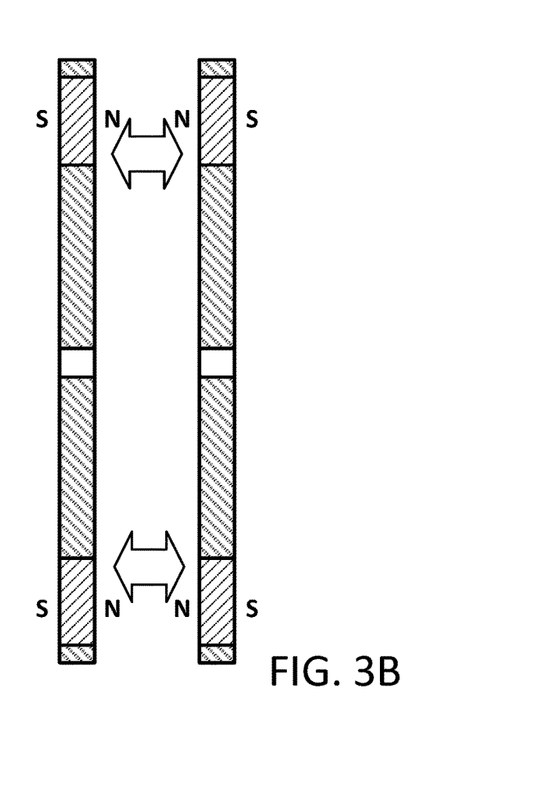

FIGS. and 3A and 4A sequentially illustrate isometric views of the joining of two magnetic rotor disks together to form a magnetic rotor assembly in accordance with one embodiment. FIGS. 3B and 4B sequentially illustrate planar views, corresponding to the isometric views in FIGS. 3A and 4A, of the joining of two magnetic rotor disks together to form a magnetic rotor assembly in accordance with one embodiment. More particularly, FIGS. 3A and 3B illustrate two assembled rotor disks 301 and 302 being brought together such that their inner faces (310, 320) each correspond to the N-poles of their respective magnets and their outer surfaces 311 and 321 conversely correspond to their S-poles. In additional or alternative implementations, the rotor disks 301, 302 may be joined by bringing together faces corresponding to the S-poles of the respective magnets.

When the individual magnets on each face 310 and 320 are perfectly aligned N-to-N, the resulting repulsive force will prevent rotor disks 301 and 302 from magnetically attaching to each other. However, upon slight rotation of the disks (e.g., about 15 degrees) such that the magnets are staggered, the magnetic fields of the magnets will be arranged in such a fashion that the rotor disks will attract and securely attach to each other (FIGS. 4A and 4B).

Figure 4A:
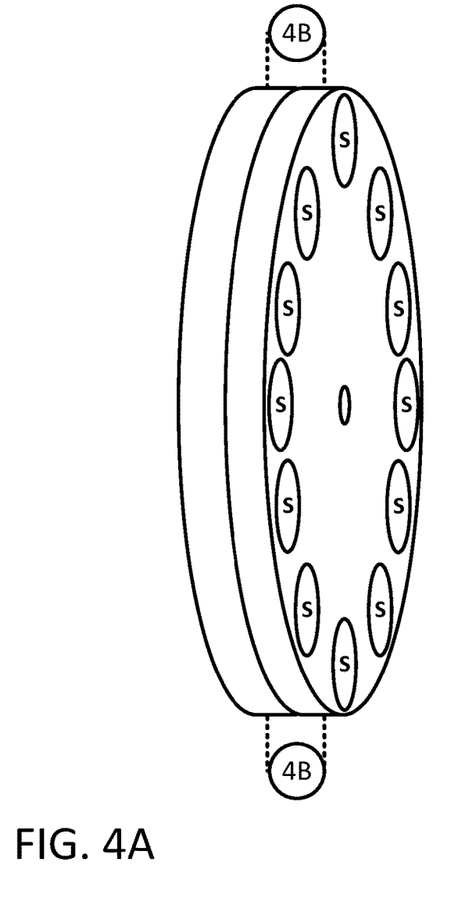
Figure 4B:
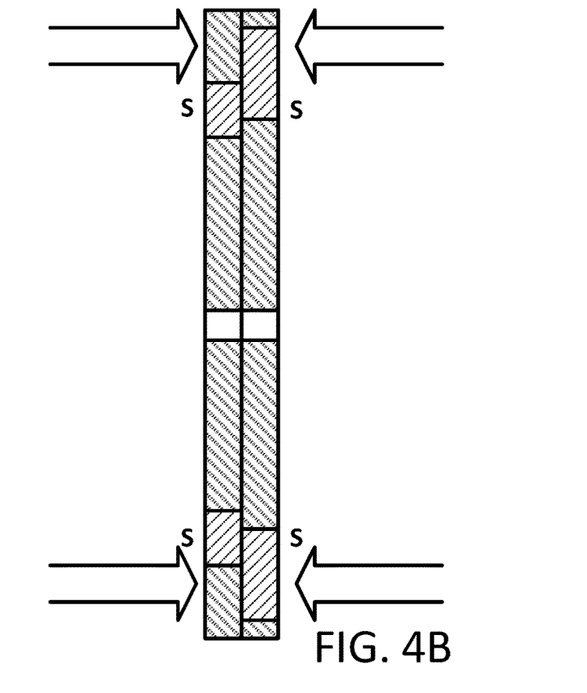
Figure 5:
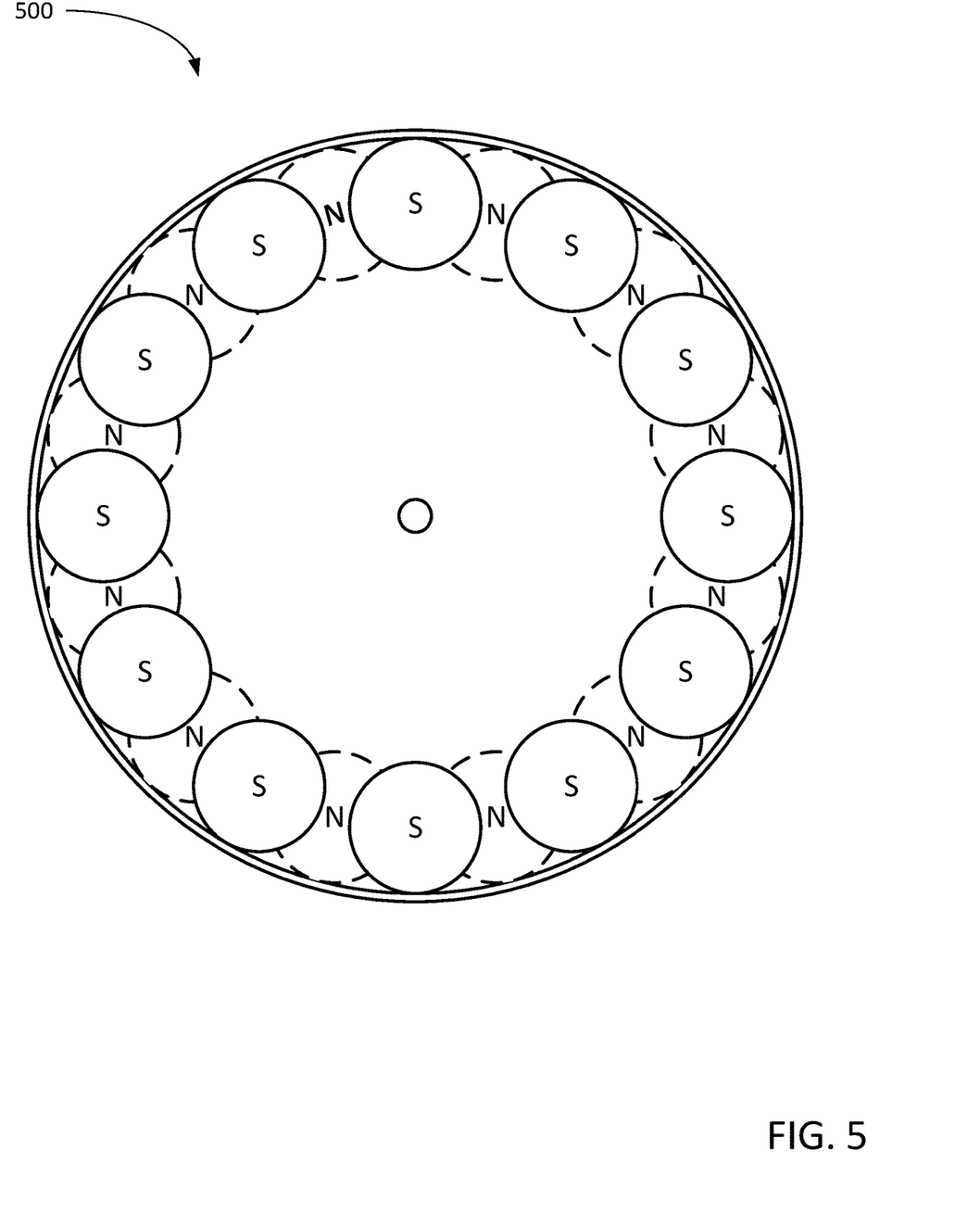
FIG. 5 is a partially transparent view of the magnetic rotor assembly illustrated in FIGS. 3 and 4.

FIG. 5 is a partially transparent view of a magnetic rotor assembly 500 such as that illustrated in FIGS. 3 and 4, showing the relative positions of the enclosed magnets. It will be apparent that the regular circumferential spacing of the magnets around the perimeter of the finished disk assembly will give rise to a similarly regular, circumferential spatial modulation in magnetic field, effectively forming a "magnetic gear" (with the regular variations in field orientation and strength corresponding to the "teeth" of the gear). Unlike mechanical gears, however, when the disk assemblies are placed adjacent to each other as shown in FIG. 1, the result is a particularly effective form of rotational magnetic coupling that is at the same time strong (i.e., adjacent disk assemblies are strongly magnetically coupled) and low-friction (due to the non-contact nature of the coupling).

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention. As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

The invention claimed is:

1. A magnetic rotor assembly comprising:
a first rotor disk comprising a first disk and a first plurality of permanent magnets circumferentially disposed about the first disk a predetermined distance from an outer perimeter of the first disk such that a first polarity for each permanent magnet of the first plurality of permanent magnets faces outward from a first side of the first disk; and
a second rotor disk comprising a second disk and a second plurality of permanent magnets circumferentially disposed about the second disk the predetermined distance from an outer perimeter of the second disk such that the first polarity for each permanent magnet of the second plurality of permanent magnets faces outward from a first side of the second disk;
wherein the first side of the first disk faces the first side of the second disk and is in contact with the first side of the second disk,
wherein the first disk and the second disk are rotated to offset relative positions such that the first plurality of permanent magnets and the second plurality of permanent magnets are in a staggered arrangement,
wherein the first plurality of permanent magnets attract the second plurality of permanent magnets based on the staggered arrangement and facing the first polarity of permanent magnets and the second plurality of permanent magnets inward between the first face of the first disk and the first face of the second disk to magnetically couple the first disk with the second disk.

2. The magnetic rotor assembly of claim 1, wherein each of the permanent magnets of the first plurality of permanent magnets is a disc-shaped neodymium magnet secured within a corresponding recess within the first disk.

3. The magnetic rotor assembly of claim 1, wherein the first plurality of permanent magnets and second plurality of permanent magnets each comprise twelve rare-earth magnets.

4. The magnetic rotor assembly of claim 3, wherein the rare-earth magnets have a diameter of approximately 1 inch.

5. The magnetic rotor assembly of claim 1, wherein the first disk and the second disk each comprise graphite and are each approximately 7 inches in diameter.

6. The magnetic rotor assembly of claim 1, wherein each of the permanent magnets of the first plurality of permanent magnets and the second plurality of permanent magnets are positioned approximately ⅛ of an inch from the outer perimeter of the first disk or the second disk, respectively.

7. A method comprising:
providing a first disk and a second disk of a predetermined diameter;
positioning a first plurality of permanent magnets within the first disk, such that each permanent magnet of the first plurality of permanent magnets is circumferentially disposed about the first disk a predetermined distance from an outer perimeter of the first disk and such that each permanent magnet of the first plurality of permanent magnets faces a first polarity outward at a first side of the first disk;
positioning a second plurality of permanent magnets within the second disk, such that each permanent magnet of the second plurality of permanent magnets is circumferentially disposed about the second disk the predetermined distance from an outer perimeter of the second disk and such that each permanent magnet of the second plurality of permanent magnets faces the first polarity outward at a first side of the second disk;
positioning the first disk and the second disk such that the first side of the first disk faces the first side of the second disk;
rotating at least one of the first disk and the second disk to offset relative positions such that the first plurality of permanent magnets and second plurality of permanent magnets are in a staggered arrangement; and, magnetically attaching the first disk to the second disk to form a magnetic rotor assembly in which the first face of the first disk is held in contact to the first face of the second disk via magnetic attraction between the first plurality of permanent magnets and second plurality of permanent magnets in the staggered arrangement.

8. The method of claim 7, wherein each permanent magnet of the first plurality of permanent magnets and the second plurality of permanent magnets has a predetermined diameter, and wherein the certain distance is approximately ⅛ of the predetermined diameter.

9. The method of claim 7, wherein each of permanent magnet of the first plurality of permanent magnets and the second plurality of permanent magnets has a first diameter, wherein the first disk and the second disk each have a second diameter, and wherein the first diameter is approximately ½ of the second diameter.

10. The method of claim 7, wherein the first polarity for each permanent magnet of the first plurality of permanent magnets that faces outward from the first side of the first disk and the first polarity for each permanent magnet of the second plurality of permanent magnets that faces outward from the first side of the second disk is a North pole.

11. The method of claim 7, wherein the first polarity for each permanent magnet of the first plurality of permanent magnets that faces outward from the first side of the first disk and the first polarity for each permanent magnet of the second plurality of permanent magnets that faces outward from the first side of the second disk is a South pole.

12. The method of claim 7, wherein each permanent magnet of the first plurality of permanent magnets is located a predetermined arc distance from adjacent permanent magnets of the first plurality of permanent magnets about the first disk, wherein each permanent magnet of the second plurality of permanent magnets is located the predetermined arc distance from adjacent permanent magnets of the second plurality of permanent magnets about the second disk, and wherein the staggered arrangement offsets the first disk relative to the second disk by half of the predetermined arc distance.

13. The magnetic rotor assembly of claim 1, wherein the first polarity for each permanent magnet of the first plurality of permanent magnets that faces outward from the first side of the first disk and the first polarity for each permanent magnet of the second plurality of permanent magnets that faces outward from the first side of the second disk is a North pole.

14. The magnetic rotor assembly of claim 1, wherein the first polarity for each permanent magnet of the first plurality of permanent magnets that faces outward from the first side of the first disk and the first polarity for each permanent magnet of the second plurality of permanent magnets that faces outward from the first side of the second disk is a South pole.

15. The magnetic rotor assembly of claim 1, wherein each permanent magnet of the first plurality of permanent magnets is located a predetermined arc distance from adjacent permanent magnets of the first plurality of permanent magnets about the first disk, wherein each permanent magnet of the second plurality of permanent magnets is located the predetermined arc distance from adjacent permanent magnets of the second plurality of permanent magnets about the second disk, and wherein the staggered arrangement offsets the first disk relative to the second disk by half of the predetermined arc distance.

16. A magnetic coupling assembly comprising:
a first rotor assembly and a second rotor assembly each comprising:
a first rotor disk comprising a first disk and a first plurality of permanent magnets circumferentially disposed about an outer perimeter of the first disk such that a first polarity for each permanent magnet of the first plurality of permanent magnets faces outward from a first side of the first disk; and
a second rotor disk comprising a second disk and a second plurality of permanent magnets circumferentially disposed about an outer perimeter of the second disk such that the first polarity for each permanent magnet of the second plurality of permanent magnets faces outward from a first side of the second disk;
wherein the first side of the first disk faces and contacts the first side of the second disk,
wherein the first disk and the second disk are rotated to offset relative positions such that the first plurality of permanent magnets and the second plurality of permanent magnets are in a staggered arrangement,
wherein the first rotor assembly is magnetically coupled to the second rotor assembly across a first distance and is offset from a rotational axis of the second rotor assembly by a second distance, perpendicular to the first distance, such that the first rotator assembly transfers rotational energy to the second rotator assembly via an electromagnetic coupling between the first polarity of permanent magnets and the second plurality of permanent magnets and not a mechanical coupling between the first rotator assembly and the second rotator assembly.

* * * * *